(12) United States Patent
Colantuono et al.

(10) Patent No.: US 11,756,409 B2
(45) Date of Patent: Sep. 12, 2023

(54) COLLABORATIVE CONTROL OF EVACUATION OF A VENUE

(71) Applicant: International Business Machines Corporation, Armonk, NY (US)

(72) Inventors: Cristiano Colantuono, Anzio (IT); Antonio Perrone, Rome (IT); Angelina Ascone, Rome (IT); Anna Daniela Pellegrino, Rome (IT); Aurelia Ceccarelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 17/448,378

(22) Filed: Sep. 22, 2021

(65) Prior Publication Data

US 2023/0090276 A1    Mar. 23, 2023

(51) Int. Cl.
*G08B 25/01* (2006.01)
*G08B 7/06* (2006.01)
*G01C 21/20* (2006.01)
*H04W 4/90* (2018.01)
*G08B 27/00* (2006.01)

(52) U.S. Cl.
CPC ......... *G08B 25/016* (2013.01); *G01C 21/206* (2013.01); *G08B 7/066* (2013.01); *G08B 27/006* (2013.01); *H04W 4/90* (2018.02)

(58) Field of Classification Search
CPC .... G08B 25/016; G08B 7/066; G08B 27/006; G01C 21/206; H04W 4/90
See application file for complete search history.

(56) References Cited

U.S. PATENT DOCUMENTS

| 7,259,656 | B1 * | 8/2007 | Wright | G09B 29/102 340/539.2 |
| 7,349,768 | B2 * | 3/2008 | Bruce | G08G 1/096844 701/1 |
| 10,026,278 | B1 | 7/2018 | Asaro | |

(Continued)

OTHER PUBLICATIONS

Disclosed Anonymously, "Method & Systems for Combination of Drone and Smart phone to Assist emergency evacuation", An IP.com Prior Art Database Technical Disclosure, IP.com No. IPCOM000259238D, IP.com Electronic Publication Date: Jul. 22, 2019, 3pages. (Year: 2019).*

(Continued)

*Primary Examiner* — Farid Seyedvosoghi
(74) *Attorney, Agent, or Firm* — Randy Tejeda

(57) ABSTRACT

In an approach to invention purpose, for controlling evacuation of a plurality of individuals carrying corresponding portable computing devices from a venue having a plurality of exits associated with corresponding exit computing devices, wherein the method comprises, under the control of the portable computing device of each of the individuals. One or more computer processors receive one or more of evacuation messages of wireless type each being transmitted by a source entity. The one or more computer processors select a selected evacuation message of the received evacuation messages according to the hop number of the received evacuation messages. The one or more computer processors subscribe to a directed exit being set to the origin exit of the selected evacuation message.

20 Claims, 7 Drawing Sheets

(56) References Cited

U.S. PATENT DOCUMENTS

| | | | |
|---|---|---|---|
| 2007/0049259 A1* | 3/2007 | Onishi | H04W 4/90 |
| | | | 455/414.2 |
| 2009/0170467 A1* | 7/2009 | Nowlan | H04W 4/90 |
| | | | 455/404.1 |
| 2016/0180663 A1 | 6/2016 | McMahan | |
| 2017/0053503 A1* | 2/2017 | Pal | G06Q 90/205 |
| 2020/0226892 A1* | 7/2020 | Coles | G08B 5/38 |
| 2021/0110683 A1* | 4/2021 | Guan | G01C 21/3461 |

OTHER PUBLICATIONS

Atila et al., "SmartEscape: A Mobile Smart Individual Fire Evacuation System Based on 3D Spatial Model", Published: Jun. 16, 2018, 19 pages, <https://www.mdpi.com/2220-9964/7/6/223>.

Disclosed Anonymously, "Method & Systems for Combination of Drone and Smartphone to Assist emergency evacuation", An IP.com Prior Art Database Technical Disclosure, IP.com No. IPCOM000259238D, IP.com Electronic Publication Date: Jul. 22, 2019, 3 pages.

Disclosed Anonymously, "Method and System for Enabling Dynamic Collaboration among AI Voice Response Systems during Evacuation from a Smart Building", An IP.com Prior Art Database Technical Disclosure, IP.com No. IPCOM000259711D, IP.com Electronic Publication Date: Sep. 9, 2019, 4 pages.

Kurdi et al., "Effect of Exit Placement on Evacuation Plans", Accepted date: Jan. 28, 2018, 33 pages, <https://www.sciencedirect.com/science/article/pii/S0377221718300869?via%3Dihub>.

\* cited by examiner

COLLABORATIVE CONTROL OF EVACUATION OF A VENUE

BACKGROUND

The present invention relates generally to the field of information technology, more specifically related to the control of venue evacuations.

Emergency evacuation is the urgent immediate egress or escape of people away from an area that contains an imminent threat, an ongoing threat or a hazard to lives or property. Examples range from the small-scale evacuation of a building to the large-scale evacuation of a city. Evacuation planning is an important aspect of business management.

SUMMARY

Embodiments of the present invention disclose a computer-implemented method, a computer program product, and a system for controlling evacuation of a plurality of individuals carrying corresponding portable computing devices from a venue having a plurality of exits associated with corresponding exit computing devices communicating with the portable computing device of each of the individuals. One or more computer processors receiving one or more of evacuation messages of wireless type each being transmitted by a source entity. The one or more computer processors select a selected evacuation message of the received evacuation messages according to the hop number of the received evacuation messages. The one or more computer processors subscribe to a directed exit being set to the origin exit of the selected evacuation message.

DETAILED DESCRIPTION

Figure 1A:
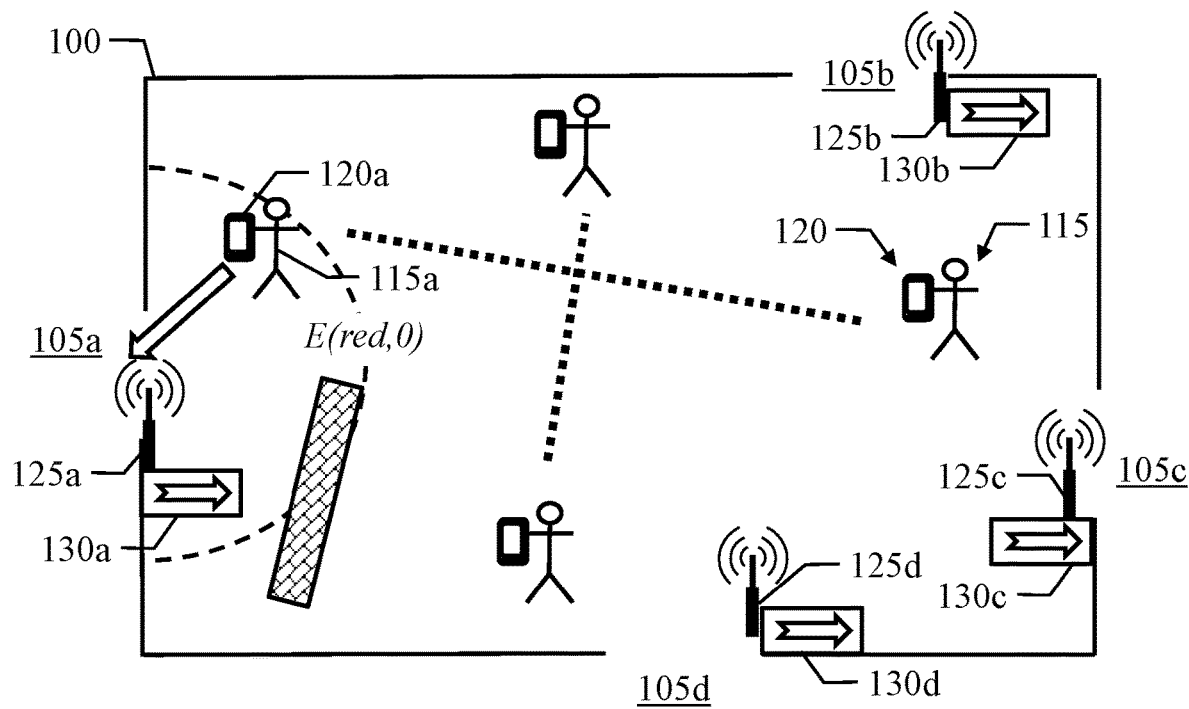
FIG. 1A-FIG. 1D (i.e., FIG.) are functional diagrams illustrating embodiments in accordance with an embodiment of the present invention.

Evacuation of individuals from many venues, especially when venues are very crowded (e.g., stadiums), may be still difficult even in normal conditions. In any case, the evacuation of these venues becomes critical in case of emergency (such as a fire). Evacuations of a venue are appropriate when conditions of the venue pose a threat to the individuals inside, so that leaving the venue is safer than remaining therein; therefore, the venue should be evacuated as quickly (and safely) as possible. However, the control of the evacuation (especially in case of emergency) is challenging. Particularly, variable human reactions may adversely affect the evacuation. For example, the individuals normally do not immediately react to alarm signals requiring to evacuate the venue. Moreover, when the venue has many exits it may be difficult to direct individuals towards the most appropriate ones; in fact, crowds tend to use to known paths to leave the venue (e.g., generally the exits through which said individuals have entered). Directing the crowd towards the most appropriate exits is especially difficult in case of emergency because individuals may readily become confused or even scared. In this scenario, it would be appropriate to distribute the individuals among the different exits, in order to limit their congestion. Moreover, should any exit become blocked (e.g., too congested) it is appropriate to re-direct the individuals to other exits. In any case, it is important to prevent panic attacks since this would cause the individuals to run chaotically in wrong directions.

In order to facilitate the evacuation, exit signs (typically in the form of pictograms) are used to indicate the exits. However, the exit signs may become difficult, if not impossible, to see; for example, this may happen in case of smoke when the exit signs are relatively far away, when individuals fall down (such as in case of earthquakes) or when obstacles (such as collapsed walls or crowds) hide exit signs. Path signs may also be used to indicate (evacuation) paths to be followed for evacuating the venue; the evacuation paths may have been determined to optimize the evacuation of the venue (for example, by applying optimization algorithms to a model of the venue). However, the path signs are unable to cope with unexpected and unpredictable events (for example, when one or more exits become blocked).

More complex emergency infrastructures may instead be used to monitor the venue; the information so collected allows determining an optimized evacuation plan in real time, either automatically (such as by means of artificial intelligence techniques) or manually (by dedicated staff of the venue). For this purpose, the venue is provided with sensors for detecting different threats (such as fires, explosions, floods, earthquakes) and with sensors for tracking the individuals inside the venue (such as IoT devices, cameras, drones). However, the emergency infrastructures may be impractical or too expensive (especially when the venue is very large or in open space).

In view of the above, the evacuation of the venue is often uncontrolled. As a result, the venue may be evacuated too slowly; this involves the risk of exposing the individuals remaining inside the venue to serious hazards.

Moreover, the individuals may panic and run chaotically in the venue; this involves the risk of causing serious damages to the individuals. For example, a crowd crush may occur when a large number of individuals move in a same direction that is blocked (such as towards a blocked exit), with the individuals in the back that push forward not knowing that those at the front are being crushed; a very high compressive force is then applied against the individuals (pushed from all sides or against the blocked exit), which compressive force may cause their asphyxiation. A crowd collapse may also occur when some individuals fall creating a hole wherein other individuals fall; the fallen individuals are squashed by the weight of the other individuals.

All of the above may be very dangerous for the individuals; in fact, the hazards from which the individuals do not escape timely and/or the damages that are caused by the chaotic running of the individuals may have serious consequences, up to cause a high number of casualties in the worse cases.

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

In general terms, embodiments of the present invention provide a method implementing a collaborative control of the evacuation. Particularly, an embodiment provides a method for controlling evacuation of individuals from a venue. Embodiments of the present invention comprise the following steps under the control of a portable computing device carried by each individual. Evacuation messages originated from the exits (each one indicating a corresponding hop number from its exit) are received. One of the evacuation messages is selected according to their hop numbers. The selected evacuation message is propagated (by incrementing its hop number). A notice for directing the individual to evacuate the venue through this exit is output so as to be (at least partially) perceivable by each other individual directed to follow the individual towards the same exit. Implementation of embodiments of the invention may take a variety of forms, and exemplary implementation details are discussed subsequently with reference to the Figures. More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

The present invention will now be described in detail with reference to the Figures.

Starting from FIG. 1A, a venue 100 has a plurality of exits, four in the example at issue denoted with the references 105a, 150b, 105c and 105d. For example, the venue 100 is a disco, a stadium, a cinema, a theater, a museum, a building and so on, and the exits 105a-105d are gates, doors, turnstiles and so on. The venue 100 may contain many individuals, collectively denoted with the reference 115. The individuals 115 carry corresponding portable computing devices, such as smartphones, collectively denoted with the reference 120.

According to an embodiment of the present disclosure, corresponding (exit) computing devices, such as beacons, 125a, 125b, 125c and 125d are associated with the exits 105a, 150b, 105c and 105d, respectively. Each beacon 125a-125d comprises a wireless transceiver for communicating with the smartphones 120. The beacons 125a, 125b 125c and 125d also control corresponding exit signs 130a, 130b, 130c and 130d, respectively, that display information helping the individuals 115 to evacuate the venue 100 through the corresponding exits 105a, 105b, 105c and 105d, respectively; for example, each exit sign 130a-130d displays an indication of an (exit) identifier of the exit 105a-105d (such as illuminated in a corresponding color, like red for the exit 105a, yellow for the exit 105b, green for the exit 105c and blue for the exit 105d). Whenever a threat is detected for the individuals 115 (automatically/manually) an evacuation procedure is started. The threat may be ongoing, imminent or simply presumed; examples of this threat are fires, explosions, floods, earthquakes, gas leaks, collapses, etc. In response thereto, the beacons 125a-125d transmit corresponding (wireless) evacuation messages. Each evacuation message comprises the exit identifier (such as a code of its color) of the exit 105a-105d associated with the beacon 125a-125d from which the evacuation message originates. Moreover, the evacuation message comprises a hop number; as explained in the following, the hop number indicates a number of hops of the evacuation message from the corresponding beacon 125a-125d through the smartphones 120 (set to zero in this case). For the sake of simplicity, the figure only shows an evacuation message E(red,0) that is broadcast by the beacon 125a. Each smartphone 120 receives any evacuation messages that are broadcast around it. In the (simplified) scenario shown in the figure, a smartphone, differentiated with the reference 120a, receives the evacuation message E(red,0). In response thereto, the smartphone 120a subscribes to the corresponding exit 105a. For this purpose, the smartphone 120a outputs a (directing) notice for directing the individual carrying it, differentiated with the reference 115a, to evacuate the venue 100 through the exit 105a. In response thereto, the individual 115a moves towards the exit 105a by looking at its exit sign 130a. The directing notice is also perceivable (at least partially) around the smartphone 120a; for example, for this purpose the screen of the smartphone 120a is completely illuminated in the color of the exit 105a (becoming red in this case).

Figure 1B:
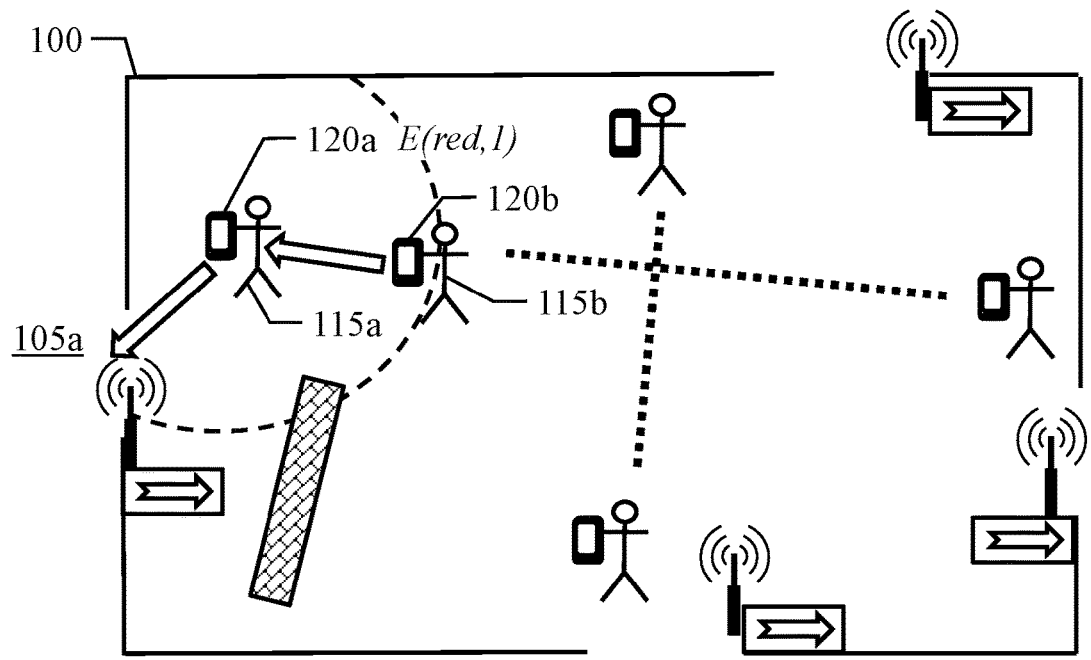

Moving to FIG. 1B, the smartphone 120a generates a (further) evacuation message E(red,1), which comprises the same exit identifier and the hop number incremented by one. The smartphone 120a then likewise broadcasts this evacuation message. In the (simplified) scenario shown in the figure, another smartphone, differentiated with the reference 120b, receives the evacuation message E(red,1). In response thereto, as above the smartphone 120b outputs a directing notice for directing the individual carrying it, differentiated with the reference 115b, to evacuate the venue 100 through the exit 105a. Therefore, the individual 115b follows the individual 115a by looking at smartphone 120a (illuminated in the same color of the exit 105a, red in this case), thereby moving towards the exit 105a in this case as well, the directing notice is also perceivable (at least partially) around the smartphone 120b.

Figure 1C:
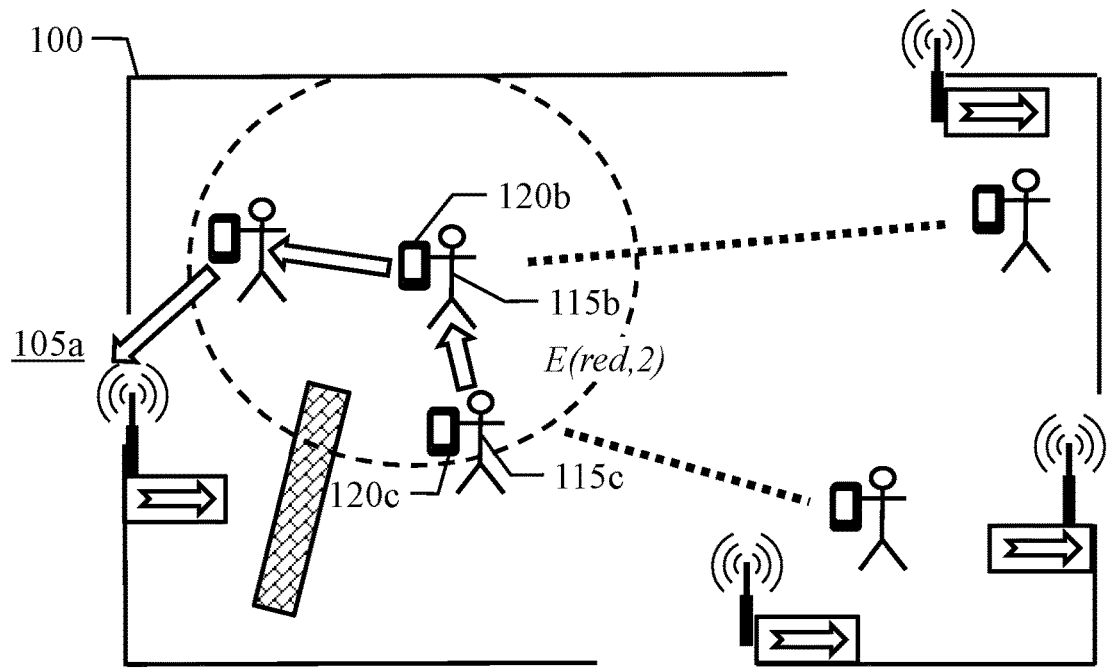

Moving to FIG. 1C, the smartphone 120b generates a (further) evacuation message, which comprises the same exit identifier and the hop number incremented by one. The smartphone 120b then likewise broadcasts this evacuation message E(red,2). In the (simplified) scenario shown in the figure, another smartphone, differentiated with the reference 120c, receives the evacuation message E(red,2). In response thereto, as above the smartphone 120c outputs a directing notice for directing the individual carrying it, differentiated with the reference 115c, to evacuate the venue 100 through the exit 105a. Therefore, the individual 115c follows the individual 115b by looking at smartphone 120b (illuminated in the same color of the exit 105a, red in this case), thereby moving towards the exit 105a. In this case as well, the directing notice is also perceivable (at least partially) around the smartphone 120c.

Figure 1D:
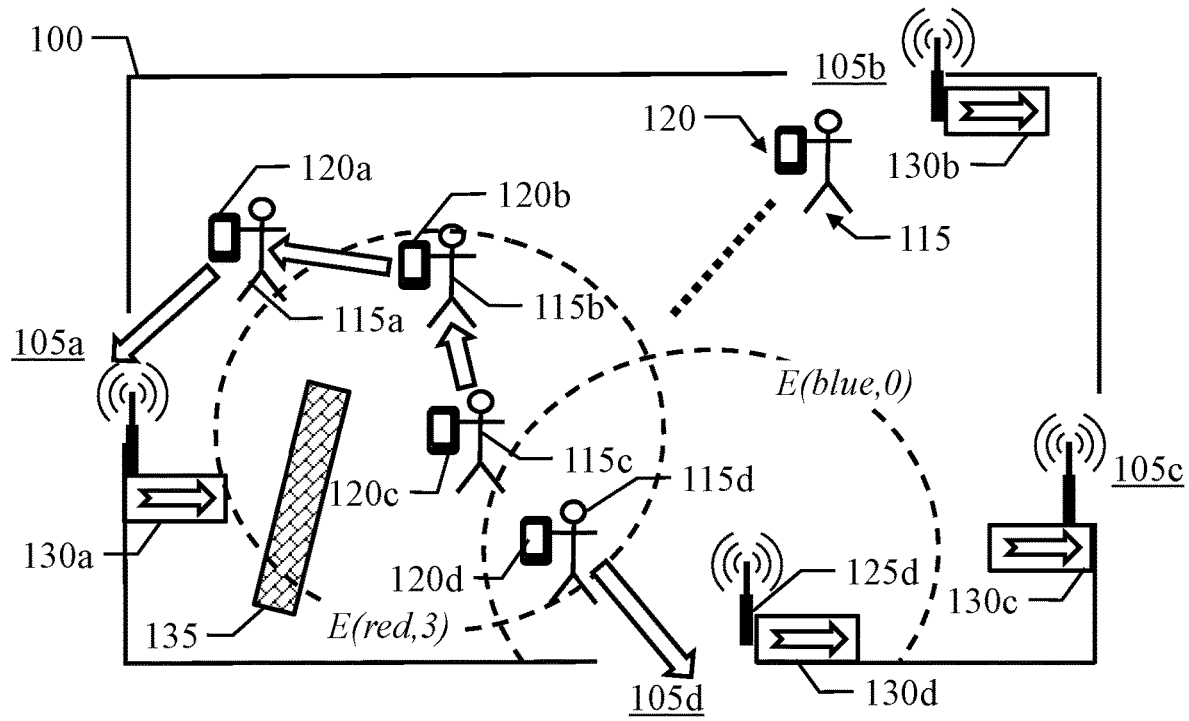

Moving to FIG. 1D, the smartphone 120c generates a (further) evacuation message, which comprises the same exit identifier and the hop number incremented by one. The smartphone 120c then likewise broadcasts this evacuation message E(red,3). FIG. 1D also shows a (further) evacuation message E(blue,0) that is likewise broadcast by the beacon 125d. In the (simplified) scenario shown in the figure, another smartphone, differentiated with the reference 120d, receives both the evacuation message E(red,3) and the evacuation message E(blue,0). Whenever any smartphone 120 receives more evacuation messages, it selects one of messages according to the hop numbers thereof (for example, the evacuation message with the lowest hop number). In this case, the smartphone 120d selects the evacuation message E(blue,0) and then the corresponding exit 105d. In response thereto, as above the smartphone 120d outputs a directing notice for directing the individual carrying it, differentiated with the reference 115d, to evacuate the venue 100 through the exit 105d. Therefore, the individual 115d moves towards the exit 105d by looking at its exit sign 130d. In this case as well, the directing notice is also perceivable (at least partially) around the smartphone 120d (with the screen of the smartphone 120d that becomes completely blue in the example at issue).

In this way, the individuals 115 are directed towards the most appropriate exits 105a-105d (generally, the closest ones); this result is achieved dynamically, and then even in case of unexpected and unpredictable events. As a result, the individuals 115 are distributed among the exits 105a-105d, thereby limiting their congestion.

For this purpose, most individuals 115 follow other individuals 115 having their smartphones 120 displaying the exit identifiers of the exits 105a-105d (up to the individuals 115 directly moving towards the corresponding exits 105-105d); as a result, the individuals 115 spontaneously form ordered queues (automatically defining corresponding optimized evacuation paths). This prevents the individuals 115 from running chaotically in wrong directions.

Moreover, these (ordered) queues allow the individuals 115 to move towards the corresponding exits 105a-105d even if individuals 115 do not see their exit signs 130a-130d. For example, in the scenario shown in the figure, the individual 115b may be unable to see the exit sign 130a, such as in case of smoke (that limits the visibility to a short distance) or when the exit sign 130a has fallen down; nevertheless, the individual 115b may move towards the exit 105a by following the individual 115a (seeing the exit sign 130a because close to it and/or directly seeing the exit 105a), looking at smartphone 120a being visible because at a shorter distance. Likewise, the individual 115c may be unable to see the exit sign 130a in case of an obstacle 135 (such as a collapsed wall), or crowd not shown in the figure, that obstructs the view; nevertheless, the individual 115c may move towards the exit 105a by following the individual 115b, looking at his/her smartphone 120b that is directly visible.

The above-mentioned results are achieved in a collaborative way (by exploiting the smartphones 120 of the individuals 115), and then without requiring any complex infrastructure. Therefore, embodiments of the present invention are cost effective and of general applicability.

All of the above significantly increases security for the individuals 115 inside the venue 100. Particularly, this allows evacuating the venue 100 quickly, thereby avoiding (or at least substantially reducing) the risk of exposing the individuals 115 remaining inside the venue 100 to hazards. Moreover, this allows evacuating the venue 100 orderly, thereby avoiding (or at least substantially reducing) the risk of causing damages to the individuals 115 (and particularly crowd crushes and crowd collapses).

Figure 2:
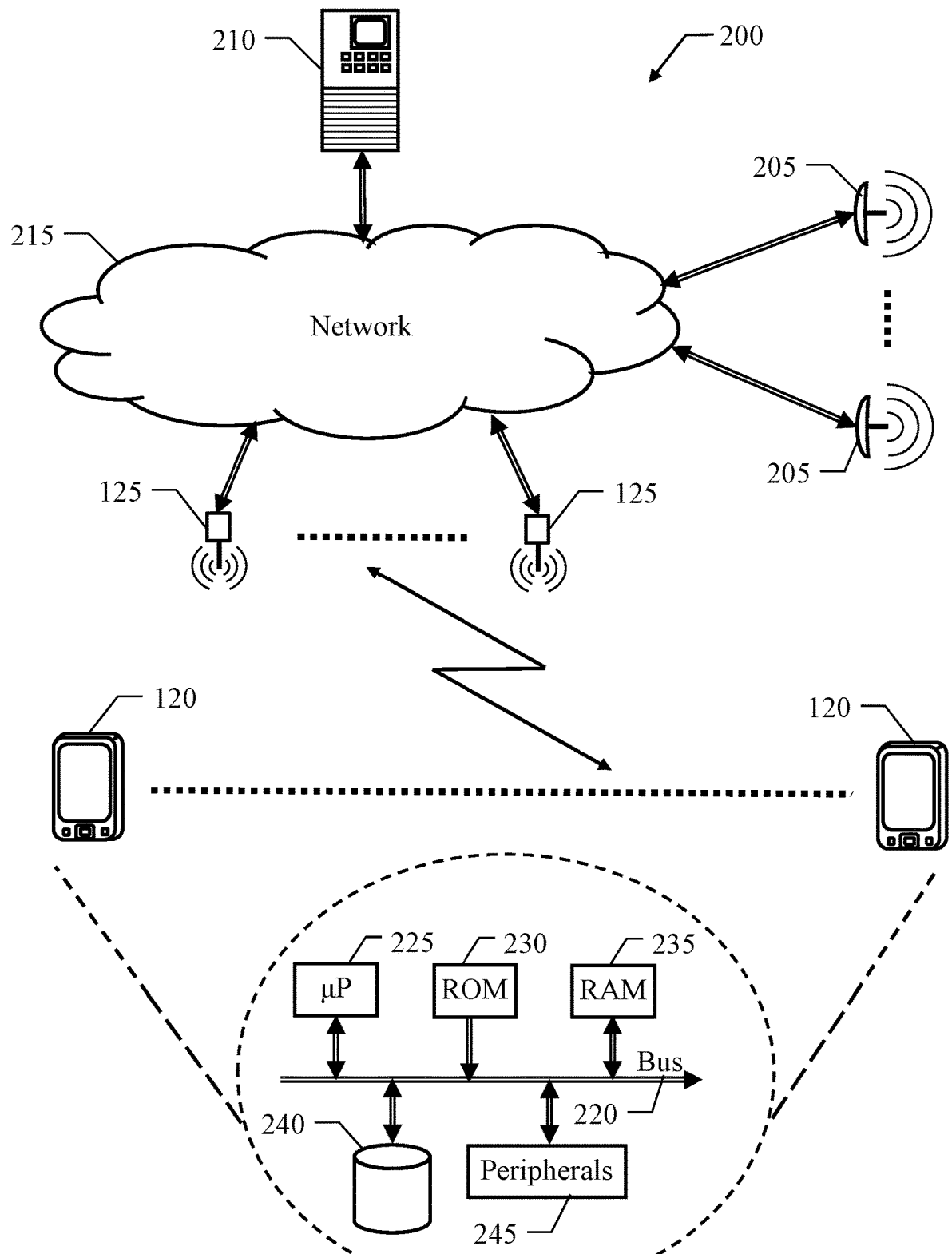
FIG. 2 is a schematic block diagram illustrating an information technology infrastructure utilized to implement a program, in accordance with an embodiment of the present invention.

With reference now to FIG. 2, a schematic block diagram is shown of an information technology infrastructure 200 that may be used to implement the program according to an embodiment of the present disclosure.

The information technology infrastructure 200 comprises the above-mentioned smartphones 120 and beacons, cumulatively denoted with the reference 125. Optionally, one or more (environment) sensors 205 are used to monitor environment parameters of the venue (not shown in in the figure), which environment parameters are useful for detecting possible threats; for example, the sensors 205 are fire detectors, explosion detectors, flood detectors, gas detectors, cameras, accelerometers and so on. Optionally, a computer 210 (for example, a PC) is used to manage the venue. The beacons 125, the sensors 205 and the computer 210 are connected to a (communication) network 215, for example, a LAN. The smartphones 120 and the beacons 125 directly communicate with a wireless Device-2-Device (D2D) communication technique; for example, the (wireless) D2D communication technique may be Bluetooth by SIG (trademarks thereof), Wi-Fi, LTE direct, etc.

Each of the above-described computing machines (i.e., smartphones 120, beacons 125 and computer 210) comprises several units that are connected through a bus structure 220 at one or more levels (with an architecture that is suitably scaled according to the type of the computing machine 120,125,210). Particularly, a microprocessor (µP) 225, or more, provides a logic capability of the computing machine 120, 125, 210; a non-volatile memory (ROM) 230 stores basic code for a bootstrap of the computing machine 120, 125, 210, and a volatile memory (RAM) 235 is used as a working memory by the microprocessor 225. The computing machine 120, 125, 210 is provided with a mass-memory 240 for storing programs and data (for example, a flash E2PROM for the smartphones 120 and the beacons 125, and an SSD for the computer 210). Moreover, the computing machine 120, 125, 210 comprises a number of controllers for peripherals, or Input/Output (I/O) units, 245; for example, as far as relevant to the present disclosure, the peripherals 245 of each smartphone 120 comprise a wireless transceiver (TX/RX), such as of Bluetooth, Wi-Fi or mobile telephone type, for communicating with the other smartphones 120 and the beacons 125, and a touch-screen for displaying information and entering data/commands, the peripherals 245 of each beacon 125 comprise the corresponding exit sign, a camera for verifying a condition of its exit, a wireless transceiver (TX/RX) of the same type as above for communicating with the smartphones 120, a passage detector for detecting the passage of every individual leaving the venue through the exit, and a network adapter (NIC) for connecting to the network 215, and the peripherals 245 of the computer 210 comprise a monitor for displaying information, a keyboard and a mouse for entering data/commands and a network adapter (NIC) for connecting to the network 215.

Figure 3:
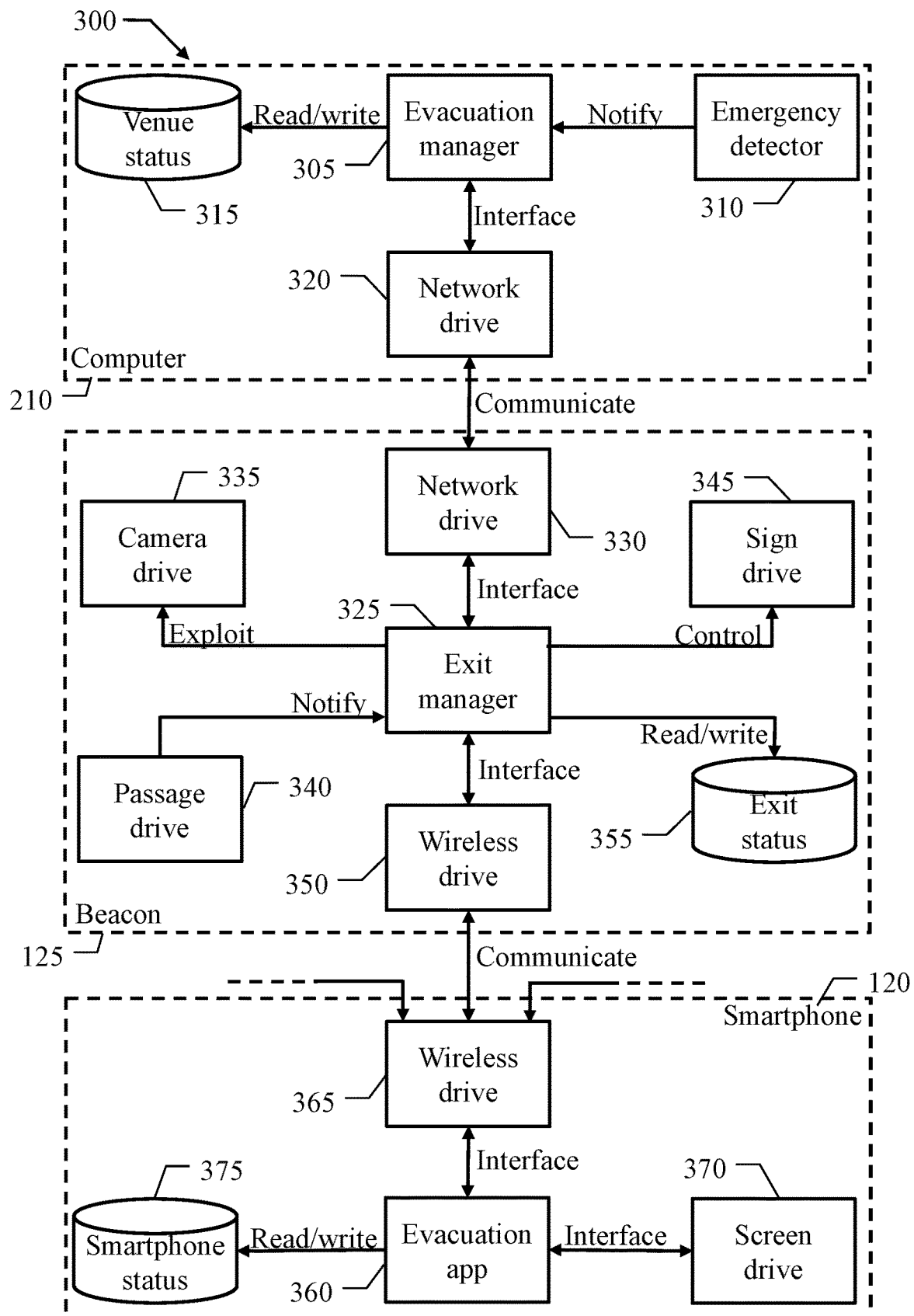
FIG. 3 illustrates software components of the program in accordance with an embodiment of the present invention.

With reference now to FIG. 3, the main software components are shown that may be used to implement the solution according to an embodiment of the present disclosure.

Particularly, all the software components (programs and data) are denoted as a whole with the reference 300. The software components are typically stored in the mass memory and loaded (at least partially) into the working memory of each computing machine (i.e., computer, beacons and smartphones) when the programs are running, together with an operating system and other application programs not directly relevant to the solution of the present disclosure (thus omitted in the figure for the sake of simplicity). The programs are initially installed into the mass memory, for example, from removable storage units or from a network (such as the Internet). In this respect, each program may be a module, segment or portion of code, which comprises one or more executable instructions for implementing the specified logical function.

Starting from the computer 210, it comprises the following components. An evacuation manager 305 manages the evacuation of the venue centrally. The evacuation manager 305 exposes a user interface for allowing staff of the venue to interact with it. An emergency detector 310 detects any emergency of the venue. The emergency detector 310 is supplied by the environment sensors and/or it exposes a user interface for allowing the staff of the venue to interact with it. The emergency detector 310 notifies the evacuation manager 305 accordingly. The evacuation manager 305 reads/writes a venue status repository 315. The venue status repository 315 contains status information of the venue relevant to its evacuation. For example, the venue status repository 315 stores an inside individual number indicating a total number of individuals that are currently inside the venue. The inside individual number is determined during normal operation of the venue. For example, the venue has one or more gates used to enter and/or to exit the venue normally (either the same or different with respect to the exits used to evacuate the venue in case of emergency); each gate has a passage detector (connected to the network) that detects the passage of every individual entering and/or exiting the venue through the gate. Whenever any individual enters or exits the venue through the gate, the passage detector notifies the computer accordingly, so as to cause it to increment or decrement, respectively, the inside individual number (initialized to zero at the beginning of every event in the venue). Moreover, the venue status repository 315 has an entry for each exit, which entry contains a central copy of status information of the exit; particularly, the entry stores an exit identifier of the entry (indicating its color in the example at issue), a condition indicator of the exit (free/blocked), a time stamp of a last update of the condition indicator, a directed individual number indicating a number of individuals directed to evacuate the venue through the exit, a hop list containing each hop number of the smartphones subscribed to the exit together with a contributor number indicating the number of smartphones with this hop number, a maximum hop number indicating the maximum number of hops of the smartphones subscribed to the exit, and an evacuated individual number indicating a number of individuals that have been evacuated through the exit. The evacuation manager 305 interfaces with a network drive 320, which drives the network adapter for communicating with all the beacons 125.

Moving to each beacon 125 (only one shown in the figure), it comprises the following components. An exit manager 325 managing evacuation of the individuals through the corresponding exit. The exit manager 325 interfaces with a network drive 330, which drives the network adapter for communicating with the computer 210. The exit manager 325 exploits a camera drive 335, which drives the camera associated with the exit. A passage detector drive 340 drives the passage detector associated with the exit. The passage detector drive 340 notifies the exit manager 325 accordingly. The exit manager 325 controls an exit sign drive 345, which drives the exit sign associated with the exit. The exit manager 325 interfaces with a wireless drive 350, which drives the wireless transceiver for communicating with all the smartphones 120. The exit manager 325 reads/writes an exit status repository 355. The exit status repository 355 contains a local copy of the status information of the exit, i.e., its exit identifier, condition indicator, directed individual number, hop list, maximum hop number and evacuated individual number.

Moving to each smartphone 120 (only one shown in the figure), it comprises the following components. An evacuation app 360 controls evacuation of the individual carrying the smartphone 120 from the venue. The evacuation app 360 interfaces with a wireless drive 365, which drives the wireless transceiver for communicating with the beacons 125 and with the other smartphones 120. The evacuation app 360 interfaces with a touch-screen drive 370, which drives the touch-screen for interacting with the individual. The evacuation app 360 reads/writes a smartphone status repository 375. The smartphone status repository 375 contains status information of the smartphone 120 relevant to the evacuation. Particularly, the smartphone status repository 375 stores a smartphone identifier of the smartphone 120 (different from the exit identifiers). For example, when the individual enters the venue through a gate thereof, the corresponding passage detector launches the evacuation app 360 (upon confirmation of the individual) and then assigns the smartphone identifier (such as equal to a unique code of the gate followed by a progressive number); alternatively, the smartphone identifier is provided by the smartphone directly (for example, set to a hash of its IMEI). Moreover, once the smartphone 120 has subscribed to a (directed) exit, the smartphone status repository 375 stores a directed identifier equal to the exit identifier of the directed exit, a predecessor identifier equal to the exit/smartphone identifier of a predecessor entity (exit/smartphone) that has caused the smartphone 120 (successor) to direct the individual to move towards the directed exit, a hop number indicating the number of hops required to reach the directed exit (through possible other smartphones 120), the maximum hop number of the directed exit, and the directed individual number of the directed exit.

Figure 4A:
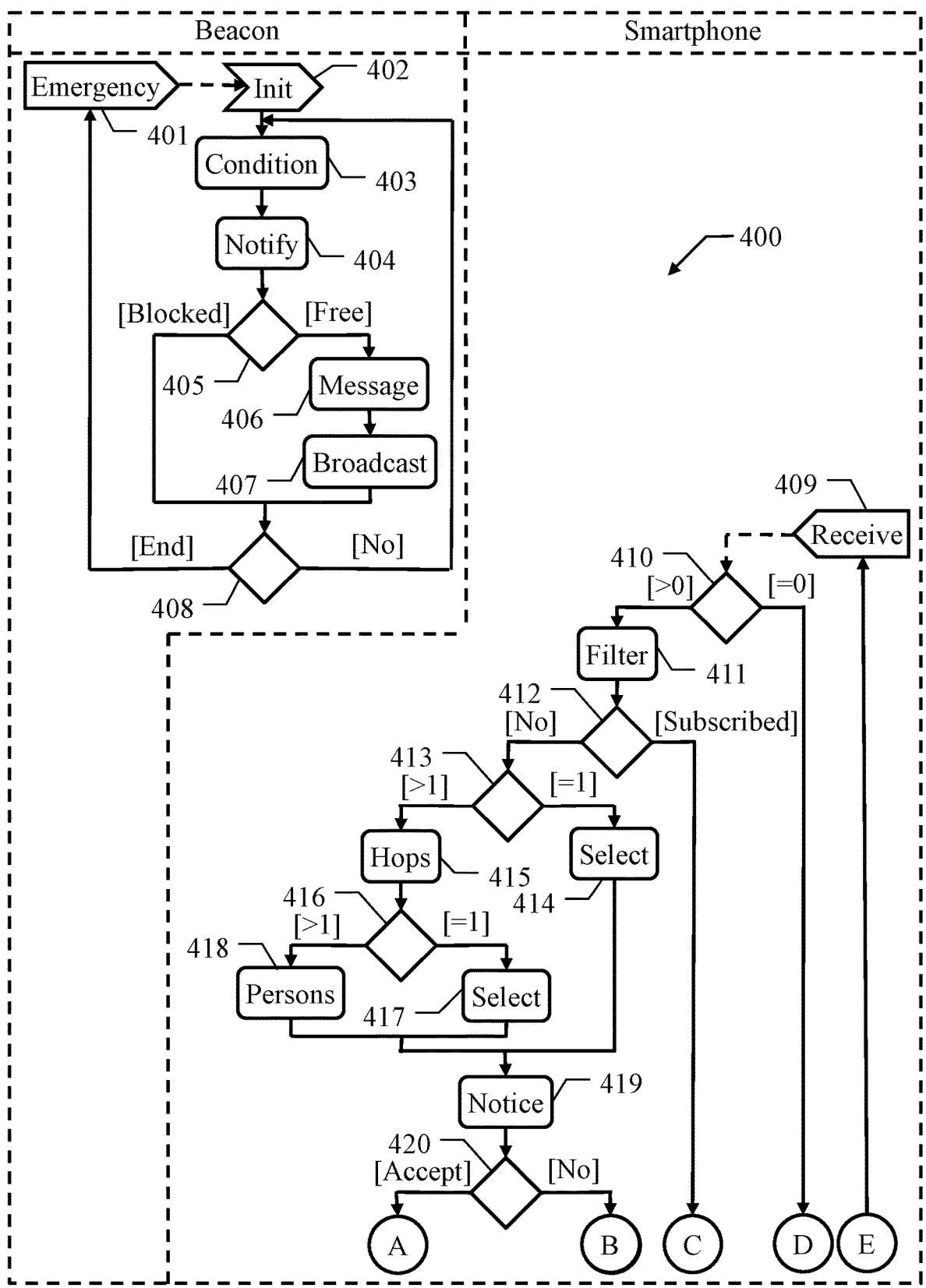
FIG. 4A-FIG. 4C are flow activity diagrams, in accordance with an embodiment of the present invention.
Figure 4B:
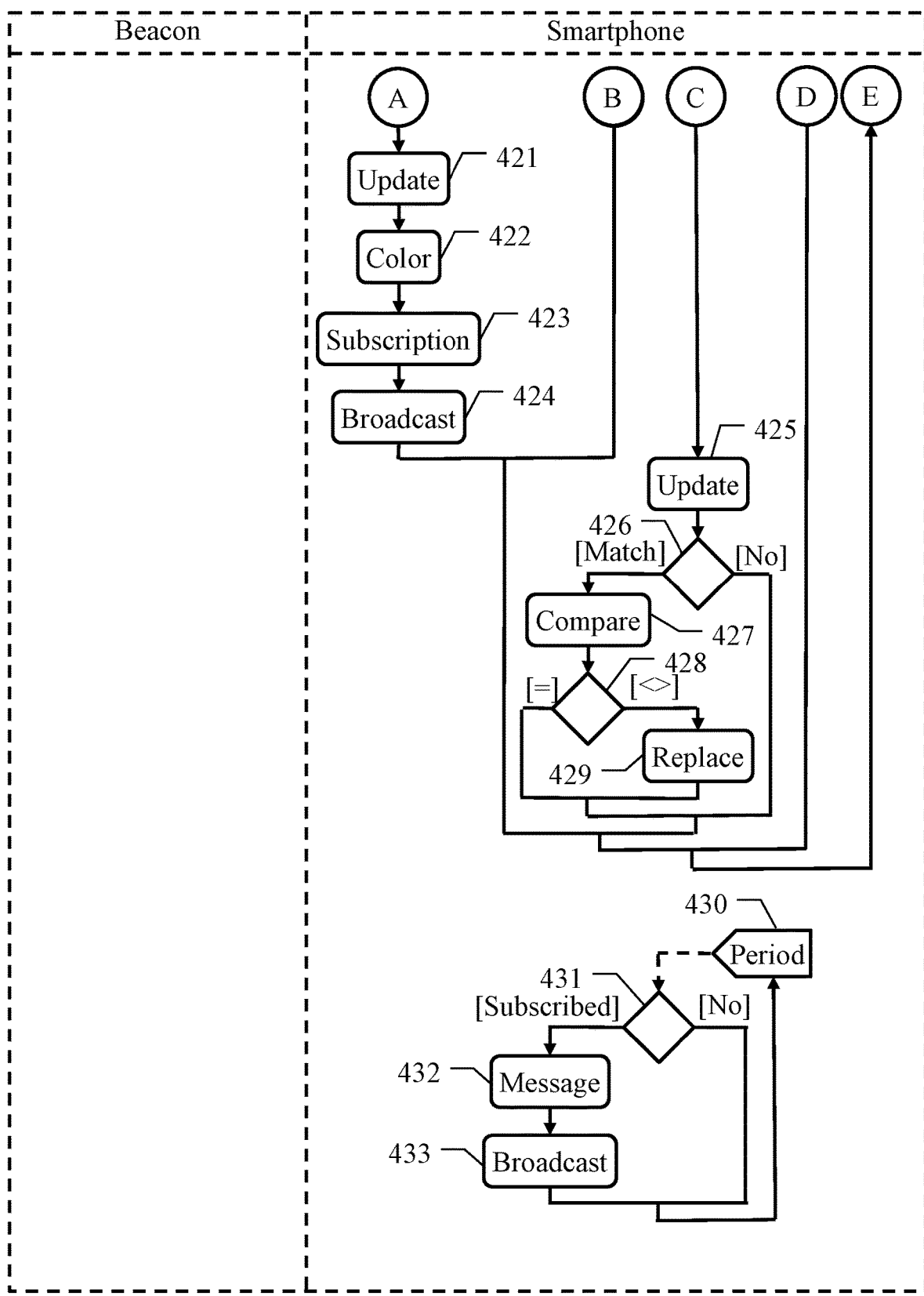
Figure 4C:
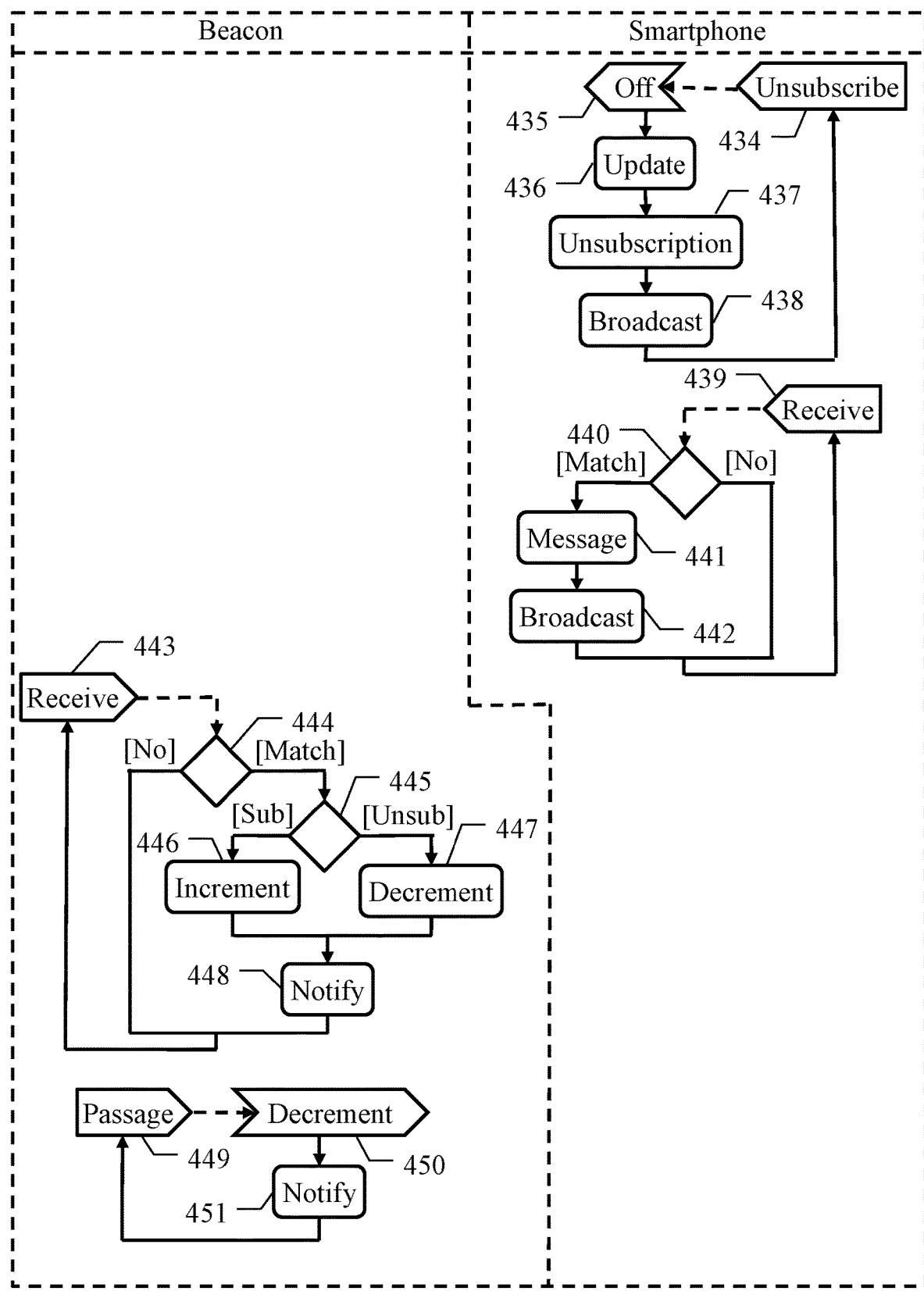

With reference now to FIG. 4A-FIG. 4C, activity diagrams is shown describing the flow of activities relating to an implementation of the solution according to an embodiment of the present disclosure. Particularly, these diagrams represent exemplary processes that may be used to evacuate the venue with a method 400. In this respect, each block may correspond to one or more executable instructions for implementing the specified logical function on the relevant computing machine (beacon or smartphone).

The process passes from block 401 to block 402 in the swim-lane of a generic beacon (only one shown in the figure) as soon as the exit manager receives a notification of an emergency from the computer (via the network drive). For example, on the computer (not shown in the figure) the emergency detector detects the emergency automatically according to the environment parameters monitored by the environment sensors, semi-automatically by further requiring a manual confirmation by the staff of the venue or manually in response to a corresponding command entered by the staff of the venue; the emergency detector notifies the evacuation manager accordingly. In response thereto, the evacuation manager initializes the status information of all the exits in the venue status repository; particularly, for each exit the evacuation manager sets the condition indicator to free with its time stamp to a current time, the hop list to empty, the maximum hop number to zero, the directed individual number to zero and the evacuated individual number to zero. Moreover, the evacuation manager notifies the emergency to all the beacons via the network drive. In response to this notification, the exit manager likewise initializes the exit status repository (by setting the condition indicator to free, the hop list to empty, the maximum hop number to zero, the directed individual number to zero and the evacuated individual number to zero). The exit manager then enters a loop at block 403, wherein it verifies (via the camera drive) the condition (free/blocked) of the exit; for example, the exit manager applies computer vision techniques to determine whether any obstacle is present in front of the exit that may prevent the individuals from evacuating the venue through the exit (such as a collapsed wall). If necessary, the exit manager updates the condition indicator in the exit status repository accordingly. The exit manager at block 404 notifies the condition indicator to the computer (via the network drive). In response thereto (not shown in the figure), the computer (receiving this notification via the network drive) updates the venue status repository accordingly (by replacing the condition indicator of the exit with its time stamp set to a current time). The flow of activity branches at block 405 according to the condition of the exit. If the exit is free, the exit manager at block 406 generates an (original) evacuation message for the exit. In general, every evacuation message has the following format: E(OriginID, SouceID, HopNumber, MaxHopNumber, DirectedNumber), wherein OriginID is an origin identifier equal to the exit identifier of the (origin) exit of the (origin) beacon from which the evacuation message originates, SourceID is a source identifier equal to the exit/smartphone identifier of the (source) entity, beacon or smartphone, that has broadcast the evacuation message, HopNumber is the hop number of the evacuation message from the origin exit to the source entity, MaxHopNumber is the maximum hop number of the origin exit and DirectedNumber is the directed individual number of the origin exit. In this case, the exit manager sets the origin identifier and the source identifier to the exit identifier of the exit retrieved from the exit status repository, the hop number to zero, the maximum hop number and the direct individual number to their values retrieved from the exit status repository. The exit manager at block 407 broadcasts the evacuation message so generated (via the wireless drive). The evacuation message is broadcast within a corresponding broadcasting range around the beacon. The broadcasting range is relatively small, so that only the smartphones close to the exit receive it; for example, the broadcasting range is equal to 0.05-0.15, preferably 0.07-0.13 and still more preferably 0.08-0.12, such as 0.1 times a maximum distance within the venue (such as 10 m for a venue with a rectangular shape having a diagonal of 100 m). The process then descends into block 408; the same point is also reached directly from the block 405 if the exit is blocked. In this way, the beacon broadcasts the evacuation message only when the exit is free, thereby avoiding the individuals from being directed to move towards the exit when it is blocked. The exit manager now verifies whether a notification of an end of the emergency has been received from the computer (via the network drive). For example, on the computer (not shown in the figure) the evacuation manager detects the end of the emergency automatically when the inside individual number has become zero, semi-automatically by further requiring a manual confirmation by the staff of the venue or manually in response to a corresponding command entered by the staff of the venue; the evacuation manager notifies all the beacons accordingly (via the network drive). If no notification of end of the emergency has been received, the process returns to the block 403 for repeating the same operations periodically (for example, every 0.1-0.5 s). Conversely, the process returns to the block 401 waiting for a next notification of an emergency.

Moving to the swim-lane of a generic smartphone (only one shown in the figure), the evacuation app continually performs a loop. The loop begins at block 409, wherein the evacuation app collects any (received) evacuation messages that have bene received via the wireless drive over a certain time-frame; the time-frame is higher than the periodicity of the broadcasting of the evacuation messages (for example, equal to 5-10 times, such as 1-5 s), so as to ensure that the smartphone receives (at least once) all the evacuation messages that are broadcast around it. The flow of activity branches at block 410 according to the number of these evacuation messages. If one or more evacuation messages have been received, the evacuation app at block 411 filters the evacuation messages by maintaining only one message for each origin exit (for example, the last received one). The flow of activity then branches at block 412 according to a condition of the smartphone. If the smartphone has not already subscribed to any exit (as indicated by the directed identifier in the smartphone status repository, initialized to a null value), the evacuation app at block 413 verifies the number of (filtered) evacuation messages that have been received. In case of a single evacuation message, the evacuation app at block 414 selects it. Conversely, the evacuation app at block 415 determines the evacuation message(s) with the lowest hop number. The flow of activity branches at block 416 accordingly. In case of a single evacuation message with the lowest hop number, the evacuation app at block 417 selects it. Conversely, the evacuation app at block 418 selects one of these evacuation messages (with the same lowest hop number) having the lowest directed individual number and then being the least crowded one (for example, the last received evacuation message in case of more with the same lowest directed individual number).

The flow of activity merges again at block 419 from the block 414, the block 417 or the block 418. At this point, the evacuation app outputs a notice asking the individual to evacuate the venue through the exit of the selected evacuation message. In this way, the individuals are directed towards the most appropriate exit (generally, the closest ones and then the least crowded one). For example, the evacuation app generates a corresponding notification that is displayed on the touch-screen (via its drive). The notification contains the origin identifier of the selected evacuation message (used by the individual to verify whether the evacuation sign of this exit or some smartphones illuminated in its color are visible); the notification may also contain the hop number, the maximum hop number and he directed individual number of the exit retrieved from the selected evacuation message as well (used by the individual to estimate a condition of the exit). The flow of activity then branches at block 420 according to a reaction of the individual. If the individual accepts to subscribe to the (directed) exit of the selected evacuation message (for example, by clicking on a corresponding button because s/he sees the directed exit or one or more smartphones illuminated in its color), the evacuation app at block 421 updates the smartphone status repository accordingly; particularly, the evacuation app sets the directed identifier to the origin identifier of the selected evacuation message, the predecessor identifier to the source identifier of the selected evacuation message, the hop number to its value in the selected evacuation message incremented by one, the maximum hop number to the one of the selected evacuation message and the directed individual number to its value in the selected evacuation message incremented by one. The evacuation app at block 422 illuminates the touch-screen completely in the color of the directed exit (for example, after displaying a message asking the individual to rise the smartphone thereby making it visible around him/her). The evacuation app at block 423 generates an (original) subscription message for the directed exit. In general, every subscription message has the following format: S(SourceID, TargetID, HopNumber), wherein SourceID is a source identifier equal to the smartphone identifier of the (source) smartphone that has broadcast the subscription message, TargetID is a target identifier equal to the exit/smartphone identifier of the (target) entity, beacon or smartphone, to which the subscription message is addressed and HopNumber is the hop number of the smartphone from which the subscription message originates. In this case, the evacuation app sets the source identifier to the smartphone identifier retrieved from the smartphone status repository, the target identifier to the predecessor identifier retrieved from the smartphone status repository, and the hop number to its value retrieved from the smartphone status repository. The evacuation app at block 424 broadcasts the subscription message so generated (via the wireless drive) within a corresponding broadcasting range (for example, the same as the one of the evacuation messages).

Referring back to the block 412, if the smartphone has already subscribed to a directed exit the evacuation app at block 425 searches for the predecessor identifier (retrieved from the smartphone status repository) in the source identifiers of the (filtered) evacuation messages that have been received. The flow of activity branches at block 426 according to a result of this search. If the predecessor identifier has been found in the source identifier of a (matching) evacuation message, the evacuation app at block 427 compares the directed individual number of the smartphone status repository with the directed individual number of this evacuation message. The flow of activity branches at block 428 according to a result of this comparison. If the two direct individual numbers differ (because the first one is either higher or lower than the second one), the evacuation app at block 429 replaces the directed individual number in the smartphone status repository with the directed individual number of the evacuation message.

The process then returns to the block 409 for repeating the same operations periodically (for example, every 1-3 seconds) from the block 424, from the block 420 (if the individual does not accept to subscribe to the exit of the selected evacuation message), from the block 429, from the block 428 (if the directed individual numbers are the same), from the block 426 (if the predecessor identifier has not been found in the source identifier of any evacuation message) or from the block 410 (if no evacuation message has been received).

In a completely independent way, a loop is performed continually. Particularly, the process passes from block 430 to block 431 as soon as a corresponding time-out expires (for example, every 0.1-0.5 seconds). The flow of activity now branches according to a condition of the smartphone. If the smartphone has already subscribed to a directed exit, the evacuation app at block 432 generates a (propagation) evacuation message; particularly, the evacuation app sets the origin identifier to the directed identifier retrieved from the smartphone status repository, the source identifier to the smartphone identifier retrieved from the smartphone status repository, the hop number, the maximum hop number and the direct individual number to their values retrieved from the smartphone status repository. The evacuation app at block 433 broadcasts the evacuation message so generated (via the wireless drive) within a corresponding broadcasting range (for example, the same as above). The process then returns to the block 430 from the block 433 or directly from the block 431 (if the smartphone has not already subscribed to any exit) for repeating the same operations periodically.

In a completely independent way, the process passes from block 434 to block 435 as soon as the evacuation app receives an unsubscription command (via the touch-screen drive) that has been entered manually by the individual. The unsubscription command is indicative of the decision of the individual not to move any longer towards the directed exit. For example, this happens when the individual determines that the directed exit is blocked, when s/he does not see any other smartphone illuminated in the color of the directed exit any longer, when s/he sees individuals proceeding far faster towards another exit and so on. In response thereto, the evacuation app stops illuminating the touch-screen in the color of the directed exit. In this way, when all the smartphone(s) visible by each corresponding following individual are not illuminated in the color of the directed exit any longer, the following individual as well is caused to unsubscribe from the directed exit in the same way. As a result, the unsubscription from the directed exit is propagated to all the following individuals along a corresponding subscription chain. These (unsubscribed) individuals than moves around until the individuals subscribe to other exits as described above. This allows re-distributing the individuals dynamically among the exits in case of any problem (for example, when an exit becomes blocked).

The evacuation app at block 436 updates the smartphone status repository accordingly. Particularly, the evacuation app resets the directed identifier to the null value. As a result, the evacuation app also stops broadcasting the corresponding evacuation message (as described above). The evacuation app at block 437 generates an (original) unsubscription message for the (former) directed exit. In general, every unsubscription message has the following format: U(SourceID, TargetID, HopNumber), wherein SourceID is a source identifier equal to the smartphone identifier of the (source) smartphone that has broadcast the unsubscription message, TargetID is a target identifier equal to the exit/smartphone identifier of the (target) entity, beacon or smartphone, to which the unsubscription message is addressed and HopNumber is the hop number of the smartphone from which the unsubscription message originates. In this case, the evacuation app sets the source identifier to the smartphone identifier retrieved from the smartphone status repository, the target identifier to the predecessor identifier retrieved from the smartphone status repository, and the hop number to its value retrieved from the smartphone status repository. The evacuation app at block 438 broadcasts the unsubscription message so generated (via the wireless drive) within a corresponding broadcasting range (for example, the same as the one of the subscription messages). The process then returns to the block 434 waiting for a next unsubscription command.

In a completely independent way, the process passes from block 439 to block 440 as soon as the evacuation app, being in a listening condition therefor, receives a (received) subscription/unsubscription message (via the wireless drive). The flow of activity then branches according to the target identifier of the subscription/unsubscription message. If the target identifier of the subscription/unsubscription message is equal to the smartphone identifier of the smartphone (retrieved from the smartphone status repository), it means that the subscription/unsubscription message is addressed thereto. Therefore, the evacuation app at block 441 generates a (propagation) subscription/unsubscription message; particularly, the evacuation app sets the source identifier to the smartphone identifier retrieved from the smartphone status repository, the target identifier to the predecessor identifier retrieved from the smartphone status repository, and the hop number to its value retrieved from the subscription/unsubscription message that has been received. The evacuation app at block 442 broadcasts the subscription/unsubscription message so generated (via the wireless drive) within the corresponding broadcasting range. The process then returns to the block 439 from the block 442 or directly from the block 440 (if the subscription/unsubscription message is not addressed to the smartphone) waiting for a (next) subscription/unsubscription message. In this way, any subscription/unsubscription message is propagated from the smartphone that has subscribed/unsubscribed along the corresponding subscription chain.

Referring again to the swim-lane of the beacon, in a completely independent way the process passes from block 443 to block 444 as soon as the exit manager, being in a listening condition therefor, receives a (received) subscription/unsubscription message (via the wireless drive). The flow of activity then branches according to the target identifier of the subscription/unsubscription message. If the target identifier of the subscription/unsubscription message is equal to the exit identifier of the exit (retrieved from the exit status repository), it means that the subscription/unsubscription message is addressed to the beacon. In view of the above, the exit manager receives the subscription/unsubscription message from each smartphone directly subscribing/unsubscribing to/from the exit. Otherwise, the exit manager receives the subscription/unsubscription message from each smartphone subscribing/unsubscribing to/from the exit through one or more other smartphones along the corresponding subscription chain (with the subscription/unsubscription message that goes in succession to the predecessor smartphone of each smartphone until reaching the beacon). The flow of activity then branches at block 445 according to the type of the message that has been received. In case of a subscription message, the exit manager at block 446 updates the exit status repository by incrementing the directed individual number by one; moreover, if the hop list already contains the hop number of the subscription message the exit manager increments its contributor number by one, whereas on the contrary the exit manager adds the hop number of the subscription message to the hop list with its contributor number set to one and it increments the maximum hop number accordingly. In case of an unsubscription message, instead, the exit manager at block 447 updates the exit status repository by decrementing the directed individual numbers by one; moreover, if the contributor number of the hop number of the subscription message in the hop list is strictly higher than one the exit manager decrements it by one, whereas on the contrary the exit manager removes this hop number from the hop list and it decrements the maximum hop number accordingly. The exit manager at block 448 notifies these changes of the exit status repository to the computer (via the network drive). In response thereto (not shown in the figure), the computer (receiving this notification via the network drive) updates the venue status repository accordingly. The flow of activity the returns to the block 443 from the block 448 or directly from the block 444 (if the subscription/unsubscription message is not addressed to the beacon) waiting for a (next) subscription/unsubscription message. In this way, the information relating to the status of each exit is updated centrally by its beacon (in response to the subscription/unsubscription messages transmitted thereto along the corresponding subscription chains), and then distributed to all the smartphone(s) subscribed to the exit (via the corresponding evacuation messages as described above.

In a completely independent way, the process passes from block 449 to block 450 as soon as the passage drive detects the passage of an individual that has left the venue through the exit and then notifies the exit manager. In response thereto, the exit manager updates the exit status repository accordingly. Particularly, the exit manager decrements the directed individual number by one and increments the evacuated individual number by one. The exit manager at block 451 notifies these changes of the exit status repository to the computer (via the network drive). In response thereto (not shown in the figure), the computer (receiving this notification via the network drive) updates the venue status repository accordingly. The flow of activity the returns to the block 449 waiting for a (next) passage through the exit.

In this way, the venue status repository provides real-time (progress) information about the progress of the evacuation. The progress information may then be provided to the staff of the venue (for example, by displaying it on the monitor of the computer); this allows the staff of the venue to monitor the evacuation, and to intervene promptly if necessary. For example, the evacuation manager may display a number of the individuals that remain to be evacuated (equal to the inside individual number minus the sum of the evacuated individual numbers of all the exits); moreover, for each exit, the evacuation manager may display its condition indicator (allowing determining whether the exit is free or blocked), time stamp (allowing determining whether the corresponding beacon is on or off), directed individual number (allowing detecting its possible congestion), hop list (allowing determining a flow of the individuals moving towards the exit), maximum hop number (allowing determining a time required to reach the exit by all the individuals moving towards it) and evacuated individual number (allowing monitoring a flow of the individuals through the exit).

Naturally, in order to satisfy local and specific requirements, an individual skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (i.e., separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling evacuation of a plurality of individuals. However, the individuals may be in any number and have to be evacuated for any reason (for example, an emergency, the end of an event such as a match, a concert or a convention, and the like); moreover, the evacuation may be controlled in any way (for example, with or without the computer collecting status information centrally, supervised by any staff or unsupervised, and so on).

In an embodiment, the individuals carry corresponding portable computing devices. However, the portable computing devices may be of any type (see below) and may be carried in any way (for example, within pockets, within bags, held by hand, worn and so on).

In an embodiment, the evacuation is from a venue. However, the venue may be of any type (for example, indoor, outdoor and so on). In an embodiment, the venue has a plurality of exits. However, the exits may in any number and of any type (for example, partial, different and additional exits with respect to the ones mentioned above, either individually or in any combination thereof). In an embodiment, the exits are associated with corresponding exit computing devices. However, the exit computing devices may be of any type (see below) and said devices may be associated with the exits in any way (for example, integrated with exits, arranged close to exits, connected to exits and so on).

In an embodiment, the method comprises the following steps under the control of the portable computing device of each of the individuals. However, this result may be achieved in any way (for example, by requesting the individual to launch a corresponding application at the entry in the venue, by launching the application automatically at the entry in the venue, by a corresponding service running in the background and so on). In an embodiment, the method comprises receiving (by the portable computing device) received one or more of evacuation messages. However, the evacuation messages may be received in any way (for example, in push mode, in pull mode and so on). In an embodiment, the evacuation messages are of wireless type. However, the evacuation messages may be of any wireless type (for example, based on any technology, exploiting any radio frequency and so on). In an embodiment, each of the evacuation messages is transmitted by a source entity, being one of the exit computing devices or one of the portable computing devices. However, the evacuation message may be transmitted in any way (for example, broadcast periodically, returned in response to a polling request, over any transmission range and so on).

In an embodiment, each of the evacuation messages comprises an origin identifier indicative of an origin one of the exits associated with an origin one of the exit computing devices from which the evacuation message originates. However, the exit identifiers may be of any type (for example, codes, color names, symbol names and so on). In an embodiment, each of the evacuation messages comprises a hop number indicative of a number of hops of the evacuation message from the origin exit computing device through the portable computing devices. However, the hop number may be of any type (for example, starting from zero, starting from one and so on).

In an embodiment, the method comprises selecting (by the portable computing device) a selected evacuation message of the received evacuation messages according to the hop number of the received evacuation messages. However, the selected evacuation message may be selected in any way (for example, automatically, such as only according to the hop numbers, further according to the directed individual numbers and the like, semi-automatically, such as by listing the exits of the received evacuation messages in decreasing order of preference according to the same criteria as above and then asking the individual the choose one of the messages, and so on).

In an embodiment, the method comprises subscribing (by the portable computing device) to a directed exit being set to the origin exit of the selected evacuation message. However, the portable computing device may subscribe to the directed exit in any way (for example, requiring a manual confirmation, automatically and so on). In an embodiment, said step of subscribing comprises outputting (by the portable computing device) a directing notice for directing the individual to evacuate the venue through the directed exit. However, the directing notice may be output in any type (for example, by displaying a message, sending a notification, uttering a vocal message, ringing an alarm, any combination thereof and so on). In an embodiment, said step of subscribing comprises transmitting (by the portable computing device) a propagation one of the evacuation messages being derived from the selected evacuation message by incrementing the hop number. However, the propagation evacuation message may be transmitted in any way (see above).

In an embodiment, the directing notice is at least partially perceivable by each following one of the individuals directed to evacuate the venue through the directed exit by the propagation evacuation message to cause the following individual to follow the individual towards the directed exit. However, the directing notice may be perceived by the following individuals in any way and at any extent (for example, by illuminating the screen of the portable computing device in a color of the directed exit, by displaying a symbol of the directed exit and so on).

Further embodiments provide additional advantageous features, which may however be omitted at all in a basic implementation.

Particularly, in an embodiment the method comprises outputting (by the portable computing device) the directing notice comprising illuminating a monitor of the portable computing device in a color identifying the directed exit. However, the colors may be of any type; moreover, the monitor may be of any type (for example, a touch-screen, a display-only screen and so on) and it may be illuminated in the color of the directed exit in any way (for example, steady, flashing and so on).

In an embodiment, each of the evacuation messages has a transmission range around the corresponding source entity lower than a maximum distance within the venue. However, the transmission range may be lower than the maximum distance at any extent (either in relative or absolute terms); in any case, the possibility is not excluded of having the transmission range covering the whole venue (for example, when each evacuation messages is addressed only to the portable computing device requesting it).

In an embodiment, the method comprises conditioning (by the portable computing device) said subscribing to the directed exit to a subscription confirmation being entered by the individual. However, the subscription confirmation may be entered in any way (for example, by clicking on a button, with a slide gesture, by uttering a vocal command and so on).

In an embodiment, the method comprises receiving (by the portable computing device) an unsubscription command for unsubscribing from the directed exit being entered by the individual. However, the unsubscription command may be entered in any way (for example, either the same or different with respect to the subscription confirmation).

In an embodiment, the method comprises unsubscribing (by the portable computing device) from the directed exit in response to the unsubscription command. However, the portable computing device may unsubscribe from the directed exit in any way (for example, directly, requiring a further manual confirmation and so on). In an embodiment, said unsubscribing comprising stopping said outputting the directing notice and said transmitting the propagation evacuation message. However, the unsubscription may involve any other additional operation(s); for example, the portable computing device may notify its successor portable computing device(s) to unsubscribe as well so as to propagate the unsubscription along the corresponding subscription chain(s).

In an embodiment, each of the evacuation messages further comprises a directed individual number indicative of a number of the individuals directed to evacuate the venue through the origin exit. However, the directed individual number of each exit may be determined in any way (for example, centrally by the exit computing device in response to corresponding subscription/unsubscription messages, locally by each portable computing device subscribing/unsubscribing to/from the exit, and so).

In an embodiment, the method comprising selecting (by the portable computing device) the selected evacuation message further according to the directed individual number of the received evacuation messages. However, the selected evacuation message may be selected in any way further according to the directed individual numbers (for example, by selecting the evacuation message with the lowest hop number and then with the lowest directed individual number, by calculating a cumulative index for each evacuation message as a weighted sum of its hop number and directed individual number and then selecting the evacuation message with the lowest cumulative index, and so on).

In an embodiment, the method comprises transmitting (by the portable computing device) an original one of subscription messages of wireless type to a predecessor entity being the source entity of the selected evacuation message in response to said subscribing to the directed exit. However, the subscription messages may be of any wireless type (either the same or different with respect to the evacuation messages) and may be transmitted in any way (for example, each broadcast with the indication of its target, sent over a dedicated channel with its target and so on); moreover, each subscription message may have any content (for example, simply indicating its source and target when broadcast or nothing when sent over a dedicated channel, further comprising the hop number of the portable computing device that originates it, and so on).

In an embodiment, the method comprises receiving (by the portable computing device) received one or more of the subscription messages. However, the subscription messages may be received in any way (for example, in push mode, in pull mode and so on).

In an embodiment, the method comprises transmitting (by the portable computing device) propagation one or more of the subscription messages corresponding to the received subscription messages to the predecessor entity. However, the propagation subscription messages may be of any type (for example, each generated from the corresponding received subscription message by changing the indication of its source and target, the same as the corresponding received subscription message being simply forwarded over a dedicated channel with its target, and so on).

In an embodiment, as a result each of the exit computing devices is caused to update the evacuation message being transmitted by the exit computing device by incrementing the directed individual number in response to each of the subscription messages transmitted thereto. However, the directed individual number may be incremented in any way (for example, only locally in the exit computing device, further centrally in the computer and so on).

In an embodiment, the method comprises transmitting (by the portable computing device) an original one of unsubscription messages of wireless type to a predecessor entity being the source entity of the selected evacuation message in response to said unsubscribing from the directed exit. However, the unsubscription messages may be of any wireless type, may be transmitted in any way and may have any content (for example, either the same or different with respect to the subscription messages).

In an embodiment, the method comprises receiving (by the portable computing device) received one or more of the unsubscription messages. However, the unsubscription messages may be received in any way (for example, either the same or different with respect to the subscription messages).

In an embodiment, the method comprises transmitting (by the portable computing device) propagation one or more of the unsubscription messages corresponding to the received unsubscription messages to the predecessor entity. However, the propagation unsubscription messages may be of any type (for example, either the same or different with respect to the unsubscription messages).

In an embodiment, as a result each of the exit computing devices is caused to update the evacuation message being transmitted by the exit computing device by decrementing the directed individual number in response to each of the unsubscription messages transmitted thereto. However, the directed individual number may be decremented in any way (for example, either the same or different with respect to its increment).

In an embodiment, the method comprises the following operations under the control of the exit computing device of each of the exits. However, the exit computing devices may be of any type (see below).

In an embodiment, the method comprises detecting (by the exit computing device) a passage of each of the individuals evacuating the venue through the exit. However, the passage may be detected in any way (for example, via any sensor, such as of optical, mechanical, infrared and the like type, a turnstile and so on).

In an embodiment, the method comprises updating (by the exit computing device) the evacuation message being transmitted by the exit computing device by decrementing the directed individual number in response to said passage. However, the directed individual number may be decremented in any way (see above).

In an embodiment, the method comprises detecting (by the exit computing device) a condition of the exit. However, the condition of the exit may be detected in any way (for example, via a camera and any computer vision technique, via any sensor, such as of optical, mechanical, infrared and the like type, automatically, semi-automatically or manually, and so on).

In an embodiment, the method comprises conditioning (by the exit computing device) said transmitting the corresponding evacuation message according to the condition of the exit. However, this operation may be performed in any way (for example, continually, only at the beginning of the evacuation, and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a portable computing device to perform the method of above when the computer program is executed on the portable computing device. An embodiment provides a computer program product that comprises one or more computer readable storage media having program instructions collectively stored in said one or more computer readable storage media, the program instructions readable by the portable computing device to cause the portable computing device to perform the same method. However, the program may be implemented as a stand-alone module (for example, a dedicated app or a dedicated function of an app of the venue), as a plug-in for a pre-existing program (for example, the operating system), or even directly in the latter. In any case, similar considerations apply if the program is structured in a different way, or if additional modules or functions are provided; likewise, the memory structures may be of other types, or may be replaced with equivalent entities (not necessarily consisting of physical storage media). The program may take any form suitable to be used by any portable computing device (see below), thereby configuring the portable computing device to perform the desired operations; particularly, the program may be in the form of external or resident software, firmware, or microcode (either in object code or in source code), for example, to be compiled or interpreted. Moreover, it is possible to provide the program on any computer readable storage medium. The storage medium is any tangible medium (different from transitory signals per se) that may retain and store instructions for use by the portable computing device. For example, the storage medium may be of the electronic, magnetic, optical, electromagnetic, infrared, or semiconductor type; examples of such storage medium are solid state memories, removable memory cards and the like. The program may be downloaded to the portable computing device from the storage medium or via a network (for example, the Internet, a wide area network and/or a local area network comprising transmission cables, optical fibers, wireless connections, network devices); one or more network adapters in the portable computing device receive the program from the network and forward it for storage into one or more storage units of the portable computing device. In any case, the solution according to an embodiment of the present disclosure lends itself to be implemented even with a hardware structure (for example, by electronic circuits integrated on one or more chips of semiconductor material), or with a combination of software and hardware suitably programmed or otherwise configured.

An embodiment provides a portable computing device comprising means that are configured for performing the steps of the above-described method. An embodiment provides a portable computing device comprising a circuitry (i.e., any hardware suitably configured, for example, by software) for performing each step of the same method. However, the portable computing device may be of any type (for example, a smartphone, a smartwatch, a tablet and so on).

An embodiment provides a system comprising corresponding portable computing devices as above being adapted to be carried by the individuals and exit computing devices associated with the exits (each having a further wireless drive for transmitting an original one of the evacuation messages having the origin identifier indicative of the exit and the hop number set to an initial value). However, each exit computing device may be of any type (for example, a microprocessor, a microcontroller, a PC and so on) and the initial value may be of any type (for example, zero, one and so on).

Generally, similar considerations apply if the portable computing device and the system each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for controlling evacuation of a plurality of individuals carrying corresponding portable computing devices from a venue having a plurality of exits associated with corresponding exit computing devices, wherein the method comprises, under the control of the portable computing device of each of the individuals:
   receiving, by the portable computing device, one or more of evacuation messages of wireless type each being transmitted by a source entity, being one of the exit computing devices or one of the portable computing devices, and comprising an origin identifier indicative of an origin one of the exits associated with an origin one of the exit computing devices from which the evacuation message originates and a hop number indicative of a number of hops of the evacuation message from the origin exit computing device through the portable computing devices;
   selecting, by the portable computing device, an evacuation message of the received evacuation messages according to the hop number of the received evacuation messages; and
   subscribing, by the portable computing device, to a directed exit being set to the origin exit of the selected evacuation message by:
      outputting, by the portable computing device, a directing notice for directing an individual to evacuate the venue through the directed exit; and
      transmitting, by the portable computing device, a propagation one of the evacuation messages being derived from the selected evacuation message by incrementing the hop number, the directing notice being at least partially perceivable by each following one of the individuals directed to evacuate the venue through the directed exit by the propagation evacuation message to cause a following individual to follow the individual towards the directed exit.

2. The computer-implemented method of claim 1, further comprising:
   outputting, by the portable computing device, the directing notice comprising illuminating a monitor of the portable computing device in a color identifying the directed exit.

3. The computer-implemented method of claim 1, wherein each of the evacuation messages has a transmission range around the corresponding source entity lower than a maximum distance within the venue.

4. The computer-implemented method of claim 1, further comprising:
   conditioning, by the portable computing device, said subscribing to the directed exit to a subscription confirmation being entered by the individual.

5. The computer-implemented method of claim 1, further comprising:
  receiving, by the portable computing device, an unsubscription command for unsubscribing from the directed exit being entered by the individual; and
  unsubscribing, by the portable computing device, from the directed exit in response to the unsubscription command by stopping said outputting the directing notice and said transmitting the propagation evacuation message.

6. The computer-implemented method of claim 1, wherein each of the evacuation messages further comprises a directed individual number indicative of a number of the individuals directed to evacuate the venue through the origin exit, comprises:
  selecting, by the portable computing device, the evacuation message further according to the directed individual and number of the received evacuation messages.

7. The computer-implemented method of claim 6, further comprising:
  transmitting, by the portable computing device, an original one of subscription messages of wireless type to a predecessor entity being the source entity of the selected evacuation message in response to said subscribing to the directed exit;
  receiving, by the portable computing device, one or more of the subscription messages; and
  transmitting, by the portable computing device, propagation one or more of the subscription messages corresponding to the received subscription messages to the predecessor entity, thereby causing each of the exit computing devices to update the evacuation message being transmitted by the exit computing device by incrementing the directed individual number in response to each of the subscription messages transmitted thereto.

8. The computer-implemented method of claim 6, further comprising:
  receiving, by the portable computing device, an unsubscription command for unsubscribing from the directed exit being entered by the individual;
  unsubscribing, by the portable computing device, from the directed exit in response to the unsubscription command by stopping said outputting the directing notice and said transmitting the propagation evacuation message;
  transmitting, by the portable computing device, an original one of unsubscription messages of wireless type to a predecessor entity being the source entity of the selected evacuation message in response to said unsubscribing from the directed exit;
  receiving, by the portable computing device, one or more of the unsubscription messages; and
  transmitting, by the portable computing device, propagation one or more of the unsubscription messages corresponding to the received unsubscription messages to the predecessor entity, thereby causing each of the exit computing devices to update the evacuation message being transmitted by the exit computing device by decrementing the directed individual number in response to each of the unsubscription messages transmitted thereto.

9. The computer-implemented method of claim 6, further comprising, under the control of the exit computing device of each of the exits:
  detecting, by the exit computing device, a passage of each of the individuals evacuating the venue through the exit; and
  updating, by the exit computing device, the evacuation message being transmitted by the exit computing device by decrementing the directed individual number in response to said passage.

10. The computer-implemented method of claim 6, further comprising, under the control of the exit computing device of each of the exits:
  detecting, by the exit computing device, a condition of the exit; and
  conditioning, by the exit computing device, said transmitting the corresponding evacuation message according to the condition of the exit.

11. A computer program product for controlling evacuation of a plurality of individuals carrying corresponding portable computing devices from a venue having a plurality of exits associated with corresponding exit computing devices comprising:
  one or more computer readable storage media and program instructions stored on the one or more computer readable storage media, the stored program instructions comprising:
  program instructions to receive one or more of evacuation messages of wireless type each being transmitted by a source entity, being one of the exit computing devices or one of the portable computing devices, and comprising an origin identifier indicative of an origin one of the exits associated with an origin one of the exit computing devices from which the evacuation message originates and a hop number indicative of a number of hops of the evacuation message from the origin exit computing device through the portable computing devices;
  program instructions to select an evacuation message of the received evacuation messages according to the hop number of the received evacuation messages; and
  program instructions to subscribe to a directed exit being set to the origin exit of the selected evacuation message by:
    program instructions to output a directing notice for directing an individual to evacuate the venue through the directed exit; and
    program instructions to transmit a propagation one of the evacuation messages being derived from the selected evacuation message by incrementing the hop number, the directing notice being at least partially perceivable by each following one of the individuals directed to evacuate the venue through the directed exit by the propagation evacuation message to cause a following individual to follow the individual towards the directed exit.

12. The computer program product of claim 11, wherein the program instructions, stored on the one or more computer readable storage media, further comprise:
  program instructions to output the directing notice comprising illuminating a monitor of the portable computing device in a color identifying the directed exit.

13. The computer program product of claim 11, wherein each of the evacuation messages has a transmission range around the corresponding source entity lower than a maximum distance within the venue.

14. The computer program product of claim 11, wherein the program instructions, stored on the one or more computer readable storage media, further comprise:

program instructions to condition said subscribing to the directed exit to a subscription confirmation being entered by the individual.

15. The computer program product of claim 11, wherein the program instructions, stored on the one or more computer readable storage media, further comprise:
    program instructions to receive an unsubscription command for unsubscribing from the directed exit being entered by the individual; and
    program instructions to unsubscribe from the directed exit in response to the unsubscription command by stopping said outputting the directing notice and said transmitting the propagation evacuation message.

16. The computer program product of claim 11, wherein the program instructions, for a directed individual number indicative of a number of the individuals directed to evacuate the venue through the origin exit, comprise
    program instructions to select the evacuation message further according to the directed individual and number of the received evacuation messages.

17. The computer program product of claim 16, wherein the program instructions, stored on the one or more computer readable storage media, further comprise:
    program instructions to transmit an original one of subscription messages of wireless type to a predecessor entity being the source entity of the selected evacuation message in response to said subscribing to the directed exit;
    program instructions to receive one or more of the subscription messages; and
    program instructions to transmit propagation one or more of the subscription messages corresponding to the received subscription messages to the predecessor entity, thereby causing each of the exit computing devices to update the evacuation message being transmitted by the exit computing device by incrementing the directed individual number in response to each of the subscription messages transmitted thereto;
    program instructions to receive an unsubscription command for unsubscribing from the directed exit being entered by the individual;
    program instructions to unsubscribe from the directed exit in response to the unsubscription command by stopping said outputting the directing notice and said transmitting the propagation evacuation message;
    program instructions to transmit an original one of unsubscription messages of wireless type to a predecessor entity being the source entity of the selected evacuation message in response to said unsubscribing from the directed exit;
    program instructions to receive one or more of the unsubscription messages; and
    program instructions to transmit propagation one or more of the unsubscription messages corresponding to the received unsubscription messages to the predecessor entity, thereby causing each of the exit computing devices to update the evacuation message being transmitted by the exit computing device by decrementing the directed individual number in response to each of the unsubscription messages transmitted thereto.

18. The computer program product of claim 16, wherein the program instructions stored on the one or more computer readable storage media under the control of the exit computing device of each of the exits further comprise:
    program instructions to detect a passage of each of the individuals evacuating the venue through the exit; and
    program instructions to update the evacuation message being transmitted by the exit computing device by decrementing the directed individual number in response to said passage.

19. The computer program product of claim 16, wherein the program instructions, stored on the one or more computer readable storage media under the control of the exit computing device of each of the exits further comprise:
    program instructions to detect a condition of the exit; and
    program instructions to condition said transmitting the corresponding evacuation message according to the condition of the exit.

20. A system for controlling evacuation of a plurality of individuals from a venue having a plurality of exits, wherein the system comprises corresponding portable computing devices being adapted to be carried by the individuals and corresponding exit computing devices associated with the exits, the portable computing device of each of the individuals comprising:
    a wireless drive for receiving received one or more of evacuation messages of wireless type each being transmitted by a source entity, being one of the exit computing devices or one of the portable computing devices, and comprising an origin identifier indicative of an origin one of the exits associated with an origin one of the exit computing devices from which the evacuation message originates and a hop number indicative of a number of hops of the evacuation message from the origin exit computing device through the portable computing devices;
    an evacuation app for selecting a selected evacuation message of the received evacuation messages according to the hop number of the received evacuation messages and for subscribing to a directed exit being set to the origin exit of the selected evacuation message by causing:
        an output drive to output a directing notice for directing the individual to evacuate the venue through the directed exit; and
        the wireless drive to transmit a propagation one of the evacuation messages being derived from the selected evacuation message by incrementing the hop number, the directing notice being at least partially perceivable by each following one of the individuals directed to evacuate the venue through the directed exit by the propagation evacuation message to cause the following individual to follow the individual towards the directed exit and the exit computing of each of the exits comprising:
            a further wireless drive for transmitting an original one of the evacuation messages having the origin identifier indicative of the exit and the hop number set to an initial value.

* * * * *